United States Patent
Güther et al.

(10) Patent No.: US 7,419,700 B2
(45) Date of Patent: Sep. 2, 2008

(54) NANOPARTICLE-MODIFIED CARBON-CERAMIC BRAKE DISCS

(75) Inventors: Hans-Michael Güther, Königstein (DE); Jens Rosenlöcher, Augsburg (DE); Moritz Bauer, Augsburg (DE)

(73) Assignee: Audi AG (DE)

( * ) Notice: Subject to any disclaimer, the term of this patent is extended or adjusted under 35 U.S.C. 154(b) by 210 days.

(21) Appl. No.: 11/215,368

(22) Filed: Aug. 30, 2005

(65) Prior Publication Data
US 2007/0237941 A1 Oct. 11, 2007

(30) Foreign Application Priority Data
Sep. 7, 2004 (EP) ................... 04021217

(51) Int. Cl.
C23C 16/32 (2006.01)

(52) U.S. Cl. ............ 427/249.2; 427/249.4; 427/255.12; 427/900; 427/190; 427/376.3; 427/397.7; 188/18 A

(58) Field of Classification Search ................ 427/380, 427/190, 397.7, 226, 376.3, 376.4, 314, 249.2, 427/249.4, 255.12, 900; 188/18 A, 361, 188/251 R
See application file for complete search history.

(56) References Cited

U.S. PATENT DOCUMENTS

| | | | |
|---|---|---|---|
| 4,837,230 A * | 6/1989 | Chen et al. ..................... 501/88 |
| 4,857,395 A * | 8/1989 | Benton et al. ............ 428/306.6 |
| 4,921,731 A * | 5/1990 | Clark et al. .................. 427/314 |
| 5,071,679 A * | 12/1991 | Heraud et al. ................ 427/264 |
| 5,143,184 A * | 9/1992 | Snyder et al. ......... 188/218 XL |
| 5,599,603 A * | 2/1997 | Evans et al. ................. 428/66.2 |
| 5,705,008 A * | 1/1998 | Hecht ......................... 156/148 |
| 5,957,251 A * | 9/1999 | Jones et al. ............. 188/251 R |
| 6,030,913 A | 2/2000 | Heine et al. |
| 6,083,560 A * | 7/2000 | Fisher et al. ............. 427/249.2 |
| 6,143,239 A | 11/2000 | Sonntag |
| 6,177,146 B1 * | 1/2001 | Fisher et al. ................. 427/544 |
| 6,197,374 B1 * | 3/2001 | Huttinger et al. .......... 427/249.2 |
| 6,231,791 B1 | 5/2001 | Heine et al. |
| 6,726,753 B2 * | 4/2004 | Koucouthakis et al. ... 106/14.12 |
| 6,855,428 B2 * | 2/2005 | Lau et al. ..................... 428/408 |
| 7,153,543 B2 * | 12/2006 | Johnson ................... 427/249.1 |
| 7,332,195 B2 * | 2/2008 | Arico et al. .............. 427/249.2 |
| 7,335,397 B2 * | 2/2008 | Rudolph et al. ........... 427/248.1 |

FOREIGN PATENT DOCUMENTS

| | | |
|---|---|---|
| DE | 197 10 105 | 9/1998 |
| DE | 103 46 498 | 4/2005 |
| EP | 0 826 651 | 3/1998 |

OTHER PUBLICATIONS

Gadow, R. et al., "CMC Brake Disks in Serial Production—The Competition Between Cost Effectiveness and Technical Performance." 26th Annual Conference on Composites, Advanced Ceramics, Materials, and Structures: B: Ceramic Engineering and Science Proceedings, vol. 23, Issue 4. Mar. 2008 (Abstract only).*
Laden, K. et al., "Frictional characteristics of Al-SiC composite brake discs." Tribology Letters 8 (2000) pp. 237-247.*

* cited by examiner

*Primary Examiner*—Bret Chen
(74) *Attorney, Agent, or Firm*—Connolly Bove Lodge & Hutz LLP

(57) ABSTRACT

Carbon-ceramic brake discs, the remaining porosity in which, after infiltration with a carbide-forming element and reaction of this element with at least part of the carbon in the preliminary body of the carbon-ceramic brake disc to form carbides, is at least partly filled with particles whose average diameter is in the range from 0.5 nm to 20 nm, and a process for producing carbon-ceramic brake discs with reduced porosity, wherein carbon-ceramic brake discs are treated with a solution of organic compounds of boron, zirconium, titanium, silicon or aluminum or mixtures of such compounds, the cited organic compounds being present as sols in an organic solvent, after removal from the sol bath the brake discs treated in this way are dried in an oven at a heating rate of between 30 K/h and 300 K/h under air or protective gas and are then tempered at a final temperature of between 350° C. and 800° C. for between 20 minutes and 120 minutes

3 Claims, No Drawings

NANOPARTICLE-MODIFIED CARBON-CERAMIC BRAKE DISCS

FIELD OF THE INVENTION

The invention concerns carbon-ceramic brake discs in which at least part of the pores of the ceramic material contains nanoparticles, and a process for producing such nanoparticle-modified carbon-ceramic brake discs.

BACKGROUND OF THE INVENTION

Carbon-ceramic brake discs consist of a carbon-fibre-reinforced ceramic material whose matrix contains silicon carbide. They can be produced by infiltrating a carbon-fibre-reinforced porous carbon body with liquid or gaseous silicon, at least part of the carbon in the matrix reacting with the silicon to form silicon carbide. Depending on the amount of silicon used for infiltration, a larger or smaller part of the pores remains in the material produced. In addition, process-related microcracks can form in the cooling phase after siliconisation due to the differing coefficients of thermal expansion of the phase components.

At least some of the remaining pores are accessible from the surface of the carbon-ceramic brake disc. Due to absorption of moisture from the environment (air or water when driving on wet roads), these pores can contain water, which evaporates when the temperature of the disc rises on braking and escapes from the pores as gas. The escaping gas can form a lubricating film between the brake disc and the brake linings and thus delay the brake response. Whilst in the conventional combination of cast iron brake discs with organically bonded brake linings this phenomenon is limited to the film of moisture adhering to the surface of the disc and the porosity of the brake linings and the gases escaping from them, due to the porosity of the ceramic brake disc materials the amount of escaping gases, and hence the time before the gas layer between brake and lining collapses, can be increased markedly. This behaviour has also been verified by experiments, wherein on wet braking the time until the brake response and the start of build-up of the coefficient of friction between disk and lining is longer in the case of the carbon-ceramic brake disc than in the case of the combination of a grey cast iron brake disc with a conventional brake lining. In the case of the carbon-ceramic brake disc, however, the build-up of the coefficient of friction is significantly faster, so the disadvantage in the response behaviour with the carbon-ceramic brake disc is more than compensated for by the fact that the dry coefficient of friction is reached more quickly.

It is desirable, however, to reduce or improve this delay in the onset of the braking action in comparison to the combination of a grey cast iron brake disc with a conventional lining.

It has further been observed that on exposure to salt solutions, particularly those arising from the thawing of mixtures of snow or ice with de-icing salts used in winter, firstly the phenomena in the wet braking behaviour described here are intensified and secondly, on frequent and relatively extended exposure to such salt solutions, chipping can occur on the friction surface in carbon-ceramic brake discs.

Attempts to reduce the porosity of carbon-ceramic brake discs by infiltration with other liquid metals or with liquid inorganic materials which harden to form a glassy substance, for example, have not achieved their aim.

SUMMARY OF THE INVENTION

The object of the invention is therefore to reduce or stop the penetration of water or salt solutions into the externally accessible pores of a carbon-ceramic brake disk without generating additional stresses by closing the pores.

The object is achieved by the at least partial filling of the pores with particles which display an average diameter in the range from 0.5 to 20 nm and which are referred to here as "nanoparticles". The average particle diameter is determined in the known manner as a number average by measuring the diameters of a random sample of the relevant particles, adding together the measured diameters and dividing this sum by the number of measured particles.

The invention therefore provides carbon-ceramic brake discs, the remaining porosity in which, after infiltration with a carbide-forming element and reaction of this element with at least part of the carbon in the preliminary body of the carbon-ceramic brake disc to form carbides, is at least partly filled with particles whose average diameter is in the range from 0.5 nm to 20 nm.

The carbon-ceramic brake discs are preferably produced by the procedure described in DE 197 10 105 A1 by infiltrating a porous preliminary body made from carbon-fibre-reinforced carbon with liquid silicon. The preliminary body is preferably produced by carbonisation, in other words heating under exclusion of oxidising gases, of a carbon-fibre-reinforced body made from phenolic resins.

The invention also provides a process for reducing the porosity of carbon-ceramic brake discs, wherein carbon-ceramic brake discs are treated with a solution of organic compounds of elements from groups IIIb, IVb, IIIa and IVa of the periodic table, in particular boron, zirconium, titanium, silicon or aluminum or mixtures of such compounds, the cited organic compounds being present as sols in an organic solvent, after removal from the sol bath the brake discs treated in this way are dried in an oven at a heating rate of between 30 K/h and 300 K/h under air or protective gas and are then tempered at a final temperature of between 350° C. and 800° C. for between 20 minutes and 120 minutes. After being cooled the brake discs are removed from the oven.

DETAILED DESCRIPTION OF THE PREFERRED EMBODIMENTS

The average diameter of the particles is preferably 1.0 nm to 10 nm, in particular 2 nm to 5 nm. The particles preferably contain oxides of elements from groups IIIb, IVb, IIIa and IVa of the periodic table, in particular boron trioxide, zirconium dioxide, titanium dioxide or mullite (mixed oxide of aluminum trioxide and silicon dioxide in the stoichiometric ratio of 3 $Al_2O_3$.2 $SiO_2$) or combinations of these oxides. These particles preferably fill at least 50% of the volume of the pores remaining after infiltration with a carbide-forming element, wherein a degree of filling of at least 70% is preferred, and in particular at least 80%. The degree of filling is determined by measuring the porosity of the carbon-ceramic brake discs before and after the treatment. The particles are formed by thermal decomposition of the cited organic compounds.

Preferred process steps are:
a) Preparation of a sol with a mass fraction of solids of 1% to 10%, preferably 2% to 6%, containing at least one organic compound selected from the group consisting of boron, zirconium, titanium, silicon and aluminium, wherein in particular ketones, esters and ethers are used as solvents, preferably selected from the group consisting of acetone, butanone-2, methyl isobutyl ketone, the acetates of aliphatic linear or branched alcohols having 2 to 8 carbon atoms and the dimethyl and diethyl ethers of glycol, diglycol and propanediol-1,2, and wherein the organic compounds are preferably alkoxides of the cited elements, in particular esters of the ortho-acids derived from these elements with preferably polyhydric linear or branched aliphatic alcohols having 2 to 12 carbon atoms, such as e.g. esters of dihydric alcohols with orthoboric acid $H_3BO_3$, b) Immersion of the carbon-ceramic brake disc to be treated in the sols according to a) and application of a reduced pressure in the gas space above the sol of preferably 5 mbar to 100 mbar (5 hPa to 100 hPa), wherein the air in the pores substantially escapes, for a period of preferably at least 15 minutes following the end of gas evolution by degassing the pore volume, and breaking the reduced pressure by aerating the immersion equipment.

c) Transferring the drained carbon-ceramic brake discs from step b) to a drying oven and heating the carbon-ceramic brake disc at a heating rate of 30 K/h to 300 K/h, preferably 50 K/h to 200 K/h, and in particular 80 K/h to 150 K/h, to a temperature of 350° C. to 800° C., preferably 450° C. to 700° C., and in particular 500° C. to 650° C. After reaching the final temperature the discs are held at this temperature for a further 15 minutes at least, preferably at least 30 minutes up to one hour, cooled down and after cooling removed from the oven. The atmosphere in the oven during the tempering process can differ from that during heating. If a protective gas is used during heating, it is advantageous to use air or an oxidising gas for at least part of the tempering process. The temperature can also be lowered to prevent an oxidative change to the tempered brake discs, by oxidation of unreacted carbon for example. The particles are formed in this step by thermal decomposition of the element-organic compounds.

The pore volume is determined by known means in accordance with DIN 51 918. It is conventionally less than 10%, preferably at most 7.5%, and particularly preferably at most 5% of the (geometric) volume of the carbon-ceramic brake disc, determined from its external dimensions. The remaining porosity (pore volume based on geometric volume) after the treatment according to the invention is therefore at most 5%, preferably at most 3.75% and particularly preferably at most 2.5%.

In the experiments on carbon-ceramic brake discs modified according to the invention it has been found that the nanoparticles deposited in the pores form a deposit primarily on the pore walls which with an adequate amount of nanoparticles forms a compact coating.

The invention is illustrated by the examples below:

EXAMPLE 1

Impregnation

A carbon-ceramic brake disc produced according to the embodiment example in DE 197 10 105 having a matrix containing carbon, silicon and silicon carbide and having carbon reinforcing fibres was dipped in a boron pentane diolate sol (mass fraction of solids 4%). The impregnating vessel was evacuated until the pressure in the gas space above was just 17 mbar (17 hPa). An evolution of gas was observed during this process, which subsided after a few minutes. The sample was left in these conditions for 15 minutes at room temperature, then the impregnating vessel was aerated and the brake disc was removed. After being dried with cellulose fleece, the brake disc was placed in a drying oven with a volume of approx. 100 l and this was heated to a temperature of 600° C. with an air flow of 5 l/h. After reaching the target temperature it was held in these conditions for a further 30 minutes, then the oven was cooled down and the sample removed. The porosity of the carbon-ceramic brake disc was 4% before the treatment and 1.9% after the treatment, determined in each case in accordance with DIN 51 918.

EXAMPLE 2

Wet Braking Test

A carbon-ceramic brake disc treated in accordance with Example 1 and a corresponding untreated carbon-ceramic brake disc were each tested on a brake test bench with regard to their wet braking performance. To this end the carbon-ceramic brake disc was accelerated to a rate of rotation corresponding to a speed of 150 km/h and was wetted by spraying with deionised water. After initiating the braking operation, the time delay $t_D$ until the onset of the braking action was measured by extrapolating the increase in the coefficient of friction to a deceleration of 4 m/s$^2$ and determining the point of intersection of this line with the time axis. Whilst with the untreated disc an average time delay $t_D$ of 980 ms was determined in 50 tests, with a disc treated according to the invention the average time delay $t_D$ was only 210 ms. In comparison, with a conventional pairing with a grey cast iron brake disc and a conventional organically bonded lining a time delay $t_D$ of 180 ms was observed.

EXAMPLE 3

Salt Test

Example 2 was repeated, the water being replaced by an aqueous solution of kitchen salt (mass fraction of NaCl in the solution: 1.5%). For the wetted disc an average delay in the onset of the braking action of 290 ms was measured (comparison with carbon-ceramic brake disc without modification according to Example 1: 1350 ms; each an average from 50 tests).

EXAMPLE 4

Salt Test with Thermal Loading

On a test bench as described in German patent application DE 103 46 498 a carbon-ceramic brake disc treated in accordance with Example 1 and an untreated carbon-ceramic brake disc of the same type were each subjected to 50 of the cycles described below, consisting of steps a) and b):

a) Spraying the carbon-ceramic brake disc on both friction surfaces with 250 ml of a salt solution as described in Example 3 b) Heating on the thermal test bench to 800° C. for a period of 30 minutes, then cooling.

In the case of the untreated carbon-ceramic brake disc, after 12 cycles isolated chips could already be seen in the area of the friction surface and after 20 cycles clear damage could be noted on the friction surface, whereas after 50 cycles the disc treated in accordance with Example 1 still showed no damage.

As has been demonstrated, filling the pores in a carbon-ceramic brake disc with particles having an average particle size in the nanometer range brought about both a clear improvement in the wet braking performance (water, salt solution) and an improved resistance to corrosive attack by salt solutions.

The invention claimed is:

1. A process for making carbon-ceramic brake discs with reduced porosity, with at least 50% of the pores of the carbon-ceramic brake discs being filled with particles having an average diameter of from 1.0 nm to 10 nm, which particles contain oxides of elements from groups IIIb, IVb, IIIa and IVa of the periodic table of the elements, wherein in the first step, a carbon-fiber reinforced porous carbon body is infiltrated with liquid or gaseous silicon, with at least partial reaction of the carbon with the silicon to form silicon carbide to produce a carbon fiber reinforced material with a matrix which matrix contains silicon carbide, in the form of a carbon-ceramic brake disc, and in the second step, the carbon-ceramic brake discs are treated with a solution of organic compounds of elements from groups IIIb, IVb, IIIa and IVa of the periodic table or mixtures of such compounds, the cited organic compounds being present as sole in an organic solvent, after removal from the sol bath the brake discs treated in this way are drained and then dried in an oven at a heating rate of between 30 K/h and 300 K/h under air or protective gas and are then tempered at a final temperature of between 350° C. and 800° for between 20 minutes and 120 minutes.

2. The process according to claim 1, characterised in that esters of the ortho-acids of boron, zirconium, titanium, silicon or aluminium with linear or branched alcohols having 2 to 12 carbon atoms are used as organic compounds.

3. The process according to claim 1, characterised in that sols having a solids content by weight of 1% to 10% in a solvent selected from the group consisting of acetone, butanone-2, methyl isobutyl ketone, acetates of aliphatic linear or branched alcohols having 2 to 8 carbon atoms and the dimethyl and diethyl ethers of glycol, diglycol and propanediol-1,2, are used as solutions of the organic compounds.

* * * * *